United States Patent
Hattori et al.

(10) Patent No.: US 7,035,553 B2
(45) Date of Patent: Apr. 25, 2006

(54) AUTOCORRELATION BIT ERROR DETECTION DEVICE AND METHOD FOR OPTICAL SIGNAL BY OPTICAL BRANCHING METHOD

(75) Inventors: Tsukasa Hattori, Ebina (JP); Motohisa Miyata, Hiratsuka (JP); Kazuhiko Yamaguchi, Atsugi (JP)

(73) Assignee: Anritsu Corporation, Tokyo (JP)

( * ) Notice: Subject to any disclaimer, the term of this patent is extended or adjusted under 35 U.S.C. 154(b) by 667 days.

(21) Appl. No.: 10/018,210

(22) PCT Filed: Mar. 21, 2001

(86) PCT No.: PCT/JP01/02240

§ 371 (c)(1),
(2), (4) Date: Oct. 30, 2001

(87) PCT Pub. No.: WO01/76121

PCT Pub. Date: Oct. 11, 2001

(65) Prior Publication Data

US 2002/0105690 A1    Aug. 8, 2002

(30) Foreign Application Priority Data

Mar. 31, 2000   (JP)   .............................. 2000-097508

(51) Int. Cl.
*H04B 10/00* (2006.01)

(52) U.S. Cl. .................... 398/204; 398/202; 398/27
(58) Field of Classification Search ........ 398/202–218, 398/27
See application file for complete search history.

(56) References Cited

U.S. PATENT DOCUMENTS

| | | | |
|---|---|---|---|
| 5,793,511 A * | 8/1998 | Bulow | 398/147 |
| 5,796,511 A * | 8/1998 | Allen et al. | 359/305 |
| 6,240,055 B1 * | 5/2001 | Takamine et al. | 369/44.29 |
| 6,583,903 B1 * | 6/2003 | Way et al. | 398/152 |

FOREIGN PATENT DOCUMENTS

| | | |
|---|---|---|
| JP | 57-101446 A | 6/1982 |
| JP | 61-3551 A | 1/1986 |
| JP | 61-29243 A | 2/1986 |

(Continued)

OTHER PUBLICATIONS

Bergano et al; Margin Measurements in Optical Amplifier Systems; 1993 IEEE Photonics Technology Letters, vol. 5, No. 3, Mar. 1993; pp. 304-306.

(Continued)

*Primary Examiner*—Agustin Bello
(74) *Attorney, Agent, or Firm*—Fishauf, Holtz, Goodman & Chick, P.C.

(57) ABSTRACT

To improve the performance for measuring autocorrelation bit errors of optical signals to be measured, an autocorrelation-bit-error detection apparatus of the present invention using an optical branch system first has an optical branch unit for branching an optical signal to be measured into a plurality of branched optical signals, a plurality of light-to-electricity converters for converting a plurality of branched optical signals supplied from the optical branch unit into electrical signals, a plurality of decision circuits for deciding relations between the electrical signals supplied from the light-to-electricity converters and their threshold values, and a detector for detecting autocorrelation bit errors of the optical signal to be measured in accordance with comparison results between the decision circuits.

5 Claims, 6 Drawing Sheets

| | FOREIGN PATENT DOCUMENTS | | |
|---|---|---|---|
| JP | 8-265273 | A | 10/1996 |
| JP | 11-261653 | A | 9/1999 |
| JP | 2000-4260 | A | 1/2000 |
| JP | 2000-115260 | A | 4/2000 |
| JP | 2000-232343 | A | 8/2000 |

OTHER PUBLICATIONS

International Telecommunication Union; ITU-T; Series G: Transmission Systems and Media, Digital Systems and Networks; Apr. 1997; pp. 1-28.

* cited by examiner $$Q = \frac{|\mu_1 - \mu_0|}{\sigma_1 + \sigma_0}$$

$\mu$: Signal average value
$\sigma$: Noise standard deviation

AUTOCORRELATION BIT ERROR DETECTION DEVICE AND METHOD FOR OPTICAL SIGNAL BY OPTICAL BRANCHING METHOD

This application is a U.S. National Phase Application under 35 USC 371 of International Application PCT/JP01/02240 (not published in English) filed Mar. 21, 2001.

TECHNICAL FIELD

The present invention generally relates to an optical-signal autocorrelation-bit-error detection apparatus to be applied to a quality evaluation technique for a high-quality optical transmission line using an optical fiber, particularly to an optical-signal autocorrelation-bit-error detection apparatus and method using an optical branch system for detecting autocorrelation bit errors of optical signals to be measured by the optical branch system.

BACKGROUND ART

Because the demands on communications have recently increased, extension of a broadband transmission line is an urgent necessity.

As a part of the above extension, a high-quality optical transmission line for a DWDM signal of, for example, 10 Gbit/s (40 Gbit/s in future) to be the mainstream hereafter is used for long-distance-land and submarine-communication lines instead of a conventional optical transmission line for a WDM signal of, for example, 2.5 Gbit/s.

In general, a bit error rate (BER) is used as a measuring system for evaluating a digital communication line.

However, because the quality of a communication line is improved as described above, an existing BER measuring system has a problem that the system requires an extremely long time (e.g. tens of hours or more) for quality evaluation.

Moreover, because a conventional error-measuring system generates a pattern the same as the pattern of an optical signal to be measured inside, the system has problems that a configuration becomes more complex and the pattern of an optical signal to be measured must be known (e.g. PRBS).

Therefore, a quality evaluation technique using a Q-factor is proposed as an effective quality evaluation technique for a high-quality optical transmission line instead of a conventional error-measuring system (IEEE PHOTONICS TECHNOLOGY VOL. 5, NO. 3, MARCH 1993, pp. 304–306).

The quality evaluation technique using a Q-factor is realized by applying the concept of S/N defined in the field of analog to digital signals, which is an evaluation technique that assumes that noise is generated in accordance with a normal distribution, so-called Gaussian distribution.

That is, as shown in FIG. 8, when assuming the average value of ON levels as $\mu_1$ the standard deviation of ON levels as $\sigma_1$ the average value of OFF levels as $\mu_0$, and the standard deviation of OFF levels as $\sigma_0$ in the so-called eye pattern of an optical signal to be measured, a Q-factor is shown by the following expression.

$$Q=|\mu_1-\mu_0|/(\sigma_1+\sigma_0)$$

Moreover, the quality evaluation technique using a Q-factor makes it possible to evaluate the quality of any high-quality line in a very short time of several-minutes.

The International Telecommunication Union (ITU-T) recommendation G. 976(April 1997) describes that the above quality evaluation method using a Q-factor is adopted for a test method to be applied to an optical-fiber submarine cable system and the like.

A configuration of a device for measuring a Q-factor specified by analyzing a linear signal is shown in FIG. 3 of the ITU-T recommendation.

An optical-signal autocorrelation-bit-error detection apparatus using an electrical-branch system is used as means for constituting the Q-factor measuring device.

The optical-signal autocorrelation-bit-error detection apparatus using an electrical-branch system converts an optical signal to be measured into an electrical signal and branches the electrical signal into two signals in accordance with an electrical technique so as to measure bit errors by using one of the two signals as a reference signal and the other of them as a noise detection signal and thereby, comparing both the signals with each other.

The autocorrelation-bit-error detection apparatus is advantageous in that because a reference signal and a noise detection signal are generated by an optical signal to be measured, it is unnecessary to previously know the pattern of the optical signal to be measured (e.g. PRBS) and generate a pattern the same as the pattern of the optical signal to be measured inside, and thereby the configuration is simplified.

FIG. 5 is a block diagram showing a configuration of the above conventional optical-signal autocorrelation-bit-error detection apparatus using an electrical-branch system.

The conventional autocorrelation-bit-error detection apparatus 1 first converts an optical signal to be measured modulated by a pulse signal into an electrical signal by a light-to-electricity converter (PD) 2.

Moreover, the electrical signal is branched into a first electrical signal and a second electrical signal by an electrical-branch unit 3.

Then, the auto-correlation-bit-error detection apparatus 1 decides the magnitude of the voltage of the branched first electrical signal and that of a reference voltage $V_{REF}$ by a decision circuit 4 and uses the decision result as a reference signal.

The decision circuit 4 includes a reference-signal generation circuit 5 in which the median of the amplitude of the branched first electrical signal is set as the reference voltage $V_{REF}$.

Moreover, the autocorrelation-bit-error detection apparatus 1 decides the magnitude of the voltage of the branched second electrical signal and that of a noise detection voltage $V_{TH}$ by a decision circuit 6 and uses the decision result as a noise detection signal.

The decision circuit 6 includes a noise detection circuit 7 in which a voltage value at an optional level slid to the mark side (H side) or space side (L side) from the center of the amplitude of the branched second electrical signal is set as the noise detection voltage $V_{TH}$.

Then, the autocorrelation-error detection apparatus 1 compares matching and mismatching between a reference signal obtained by the decision circuit 4 and reference-signal generation circuit 5 and a noise detection signal obtained by the decision circuit 6 and noise detection circuit 7 by a detector 9 including an error comparison circuit 8.

The detector 9 including the error comparison circuit 8 detects a case in which comparison results are not matched by assuming that autocorrelation bit errors occur in optical signals to be measured.

FIG. 6 is an illustration showing an autocorrelation bit error detection state of the above conventional optical-signal autocorrelation-bit-error detection apparatus 1 using an electrical-branch system.

As described above, because the reference voltage $V_{REF}$ is set to the median of the amplitude of the branched first electrical signal by the reference-signal generation circuit 5 included in the decision circuit 4, the voltage $V_{REF}$ is set to approximately midway between the mark side (L) and the space side (H) in FIG. 6.

As described above, the noise detection voltage $V_{TH}$ is set to an voltage value at an optional level slid to the mark side (H) or space side (L) from the center of the amplitude of the branched second electrical signal by the noise detection circuit 7 included in the decision circuit 6. In this case, however, a case is shown in which the voltage $V_{TH}$ is set to the mark side (H).

Moreover, FIG. 6 shows a case in which when the voltage of the branched first electrical signal is higher than the reference voltage $V_{REF}$ but it is lower than the noise detection voltage $V_{TH}$, it is detected by the detector 9 of the autocorrelation-bit-error detection apparatus 1 that autocorrelation bit errors occur in optical signals to be measured.

FIG. 9 is an illustration for explaining the principle of a Q-factor measuring system to be executed by the above conventional autocorrelation-bit-error detection apparatus 1 using an electrical-branch system.

That is, as described above, the reference voltage $V_{REF}$ is set to the approximate center between eye patterns ("L" and "H").

Moreover, the noise detection voltage $V_{TH}$ is changed between $V_{TH1}$ corresponding to the average value $\mu_1$ of ON levels of the eye patterns and $V_{TH0}$ corresponding to the average value $\mu_0$ of OFF levels of the eye patterns.

Thus, by performing the $V_{TH1}$-and-$V_{TH0}$-to-BER measurement, these measurement results are plotted as Pa1, Pa2, Pa3, Pa4, Pa5, Pa6, . . . , Pb1, Pb2, Pb3, Pb4, Pa5, Pb6, . . . as shown in FIG. 9.

Then, an optimum threshold voltage $V_{opt}$ is calculated in accordance with the measurement results.

Then, the Q-factor and BER at the optimum threshold voltage $V_{opt}$ are calculated.

The above calculation is performed in order to theoretically estimate a bit error portion in which a bit error occurrence rate including a V-shaped intersecting portion shown by a broken line below plots in FIG. 9 is as extremely low as, for example, the $10^{-20}$ order.

The relation between the Q-factor and the BER is shown by the following expression in accordance with ANNEX A A. 1 of the above ITU-T recommendation G. 976.

$$BER=\{1/(2\pi)^{1/2}\}\times\{Exp(-Q^2/2)/Q\}$$

As shown in FIG. 5, the conventional autocorrelation-bit-error detection apparatus 1 using an electrical-branch system converts an optical signal to be measured into an electrical signal by the light-to-electricity converter (PD) 2 and then, branches the electrical signal into first and second electrical signals by the electrical-branch unit 3.

FIG. 7 is an illustration showing the conversion characteristic of the light-to-electricity converter (PD) 2, which is a graph in which the power of input light is expressed by the abscissa axis and the output current is expressed by the ordinate axis.

As shown in FIG. 7, in the conversion characteristic from light to electricity by the light-to-electricity converter (PD) 2, a portion in which linearity is shifted by 1 dB is assumed as a compression point $P_{comp}$.

That is, the compression point $P_{comp}$ serves as a criterion for operating the light-to-electricity converter 2 in its linear area by avoiding its saturated area.

This is because when the light-to-electricity converter 2 is operated in its saturated area, it is impossible for the autocorrelation-bit-error detection apparatus 1 to accurately detect autocorrelation bit errors of optical signals to be measured.

Therefore, for the autocorrelation-bit-error detection apparatus 1 using the conventional electrical-branch system to detect autocorrelation bit errors of optical signals to be measured while securing linearity, it is necessary to input an optical signal having a power smaller than the compression point $P_{comp}$ as an optical signal to be measured.

Therefore, the autocorrelation-bit-error detection apparatus 1 using the conventional electrical-branch system has a problem that the power level of a usable optical signal is restricted to a predetermined level (e.g. 0 dB) or lower.

Moreover, in the case of the autocorrelation-bit-error detection apparatus 1 using the conventional electrical-branch system, because an electrical signal is branched by the rear-stage electrical-branch unit 3 of the light-to-electricity converter (PD) 2, the output power of the compression point $P_{comp}$ of the light-to-electricity converter (PD) 2 is further lowered due to branch and supplied to the decision circuits 4 and 6.

That is, because the power supplied to the decision circuits 4 and 6 is lowered due to the power loss based on a branch impedance in the electrical-branch unit 3, a problem occurs that the whole S/N of the autocorrelation-bit-error detection apparatus 1 is deteriorated.

For example, when an output of the light-to-electricity converter (PD) 2 is equal to 1 mW, inputs supplied to the decision circuits 4 and 6 are respectively lowered to 0.25 mW because the power loss of the electrical-branch unit 3 is equal to 0.5 mW.

Then, even if an electrical-amplifier is provided for the decision circuits 4 and 6 to amplify the lowered inputs, the electrical-amplifier has problems that it has a large noise (approx. 3 times larger than that of an optical amplifier in terms of NF), inferior linearity, and inferior response characteristic due to its waveform distortion.

Therefore, in the case of the autocorrelation-bit-error detection apparatus 1 using a conventional electrical-branch system, because it is difficult to improve the performance for measuring bit errors of optical signals to be measured in accordance with an autocorrelation system, the apparatus 1 has a problem that it is impossible to make the most use of advantages of the quality evaluation technique for a high-quality line according to the above Q-factor.

DISCLOSURE OF INVENTION

The present invention is made to solve the above problems and its object is to provide an apparatus and an optical-signal autocorrelation-bit-error detection method using an optical branch system capable of making the most use of advantages of the quality evaluation technique for a high-quality line using a Q-factor by improving the performance for measuring bit errors of optical signals to be measured in accordance with an autocorrelation system.

A first aspect of the present invention provides an optical-signal autocorrelation-bit-error detection apparatus using an optical branch system, which comprises:

optical branch means (11) for branching an optical signal to be measured modulated by a pulse signal and outputting the optical signal as first and second optical pulse signals;

first light-to-electricity conversion means (2b) for converting the first pulse signal supplied from the optical branch means into a first electrical signal and outputting the first electrical signal;

second light-to-electricity conversion means (2a) for converting the second pulse signal supplied from the optical branch means into a second electrical signal and outputting the second electrical signal;

first decision means (4) for outputting a reference pulse signal in accordance with a result of comparing the voltage of the first electrical signal supplied from the first light-to-electricity conversion means with the reference-signal generation voltage set to an approximate median of the amplitude of the first electrical signal;

second decision means (6) for outputting a measuring pulse signal in accordance with a result of comparing the voltage of the second electrical signal supplied from the second light-to-electricity conversion means and the noise detection voltage set to an optical level slid to the mark side or space side from an approximate median of the amplitude of the second electrical signal; and bit-error detection means (9) for detecting autocorrelation bit errors of optical signals to be measured in accordance with a result of comparing the reference pulse signal supplied from the first decision means with the measuring pulse signal supplied from the second decision means.

Moreover, a second aspect of the present invention provides the optical-signal autocorrelation-bit-error detection apparatus using an optical branch system according to the first aspect, characterized in that the optical branch means (11) outputs the first and second optical pulse signals by setting magnitudes of the pulse signals as n:m (n<m) when branching the optical signals to be measured.

Furthermore, a third aspect of the present invention provides the optical-signal autocorrelation-bit-error detection apparatus using an optical branch system according to the first aspect characterized in that:

the optical branch means (11) branches the optical signal to be measured into N signals (N is an integer of 3 or more) and outputs N signals as first, second, third, . . . , and Nth optical pulse signals, the autocorrelation-bit-error detection apparatus further comprises;

third to Nth light-electricity conversion means (2a2, . . . and 2aN−1) for converting the third to Nth pulse signals supplied from the optical branch system into third to Nth electrical signals and outputting the electrical signals; and third to Nth decision means (6) for outputting second to Nth measuring pulses in accordance with results of comparing voltages of the third to Nth electrical signals supplied from the third to Nth light-to-electricity conversion means with noise detection voltages set to optional levels slid from approximate medians of amplitudes of the third to Nth electrical signals to the mark side or space side, and the bit-error detection means (9) detects autocorrelation bit errors of the optical signals to be measured in accordance with results of comparing the reference pulse signal supplied from the first decision means with the second to Nth measuring-pulse signals supplied from the second to Nth decision means.

A fourth aspect of the present invention provides the optical-signal autocorrelation-bit-error detection apparatus using an optical branch system according to the first aspect, characterized by making it possible to measure the autocorrelation-bit-error rate of the optical signals to be measured in accordance with the counted value of autocorrelation bit errors of the optical signals to be measured supplied from the bit error detection means (9) and the counted value of clock signals.

A fifth aspect of the present invention provides an optical-signal autocorrelation-bit-error detection method using an optical branch system, which comprises the steps of:

branching an optical signal to be measured modulated by a pulse signal and outputting the optical signal as first and second optical pulse signals;

converting the first pulse signal into a first electrical signal and outputting the electrical signal;

converting the second pulse signal into a second electrical signal and outputting the electrical signal;

outputting a reference pulse signal in accordance with a result of comparing the voltage of the first electrical signal with the reference-signal generation voltage set to an approximate median of the amplitude of the first electrical signal; and outputting a measuring pulse signal in accordance with a result of comparing the voltage of the second electrical signal with the noise detection voltage set to an optional level slid from an approximate median of the amplitude of the second electrical signal to the mark side or space side, detecting autocorrelation bit errors of the optical signals to be measured in accordance with a result of comparing the reference pulse signal and the measuring pulse signal.

A sixth aspect of the present invention provides the optical-signal autocorrelation-bit-error detection method using an optical branch system according to the fifth aspect, which further comprises the step of measuring the autocorrelation-bit-error rate of the optical signal to be measured in accordance with the counted value of autocorrelation bit errors of the optical signals to be measured and the counted value of clock signals.

In the case of an autocorrelation error detection apparatus of the present invention using an optical branch system, because an optical signal to be measured is previously branched, it is possible to increase the power of an optical signal input to the optical branch means to +3 dBm (the power of input light is doubled compared to the case of a conventional autocorrelation error detection apparatus using an electrical branch system) until an optical signal necessary to secure the linearity of an output of light-to-electricity conversion means (PD) becomes 0 dBm after branching is performed by optical branch means as described later. Therefore, it is possible to raise the power level of a usable optical signal up to +3 dBm (2 mW) though the power level has been restricted up to 0 dBm so far.

According to the above optical-signal autocorrelation-bit-error detection apparatus using an optical branch system, by previously branching an optical signal to be measured and then converting branched optical signals into electrical signals and deciding them, it is possible to raise a voltage to be supplied to decision means and prevent S/N from deteriorating compared to the case of previously converting an optical signal to be measured into an electrical signal and then branching the electrical signal into signals and deciding them like the prior art.

Moreover, according to an optical-signal autocorrelation-bit-error detection apparatus using an optical branch system, when the input level of the light entering the autocorrelation-bit-error detection apparatus is constant, the voltage to be supplied to decision means also becomes constant.

Next, a distortion within an electrical-branch system is described below.

When previously converting an optical signal to be measured into an electrical signal and then branching the electrical signal into signals and deciding them like the case of the prior art, a distortion of a signal occurs in an electrical-branch unit for branching the electrical signal.

However, when using a method using an optical branch system like the case of the present invention, a distortion due to the optical branch portion of the optical branch system hardly occurs in an optical signal.

This is because if mismatching of resistance values for branching used for an electrical-branch unit serving as the branch portion of an electrical-branch system occurs, it causes reflection of an electrical signal to be branched and the reflection influences the rear stage as a distortion.

However, when performing branching by light, as in the optical branch system of the case of the present invention, reflection does not occur at an optical branch portion and thereby a distortion due to the optical branch portion does not occur.

Moreover, a distortion caused in an electrical-branch system becomes larger as the transmission frequency of a signal to be measure further rises. However, when using an optical branch system, a distortion does not influence a rear stage at all because the system is overwhelmingly superior to an electrical-branch system in its frequency characteristics.

Therefore, according to the present invention, a remarkable advantage is obtained that it is possible to reduce the influence of waveform distortions at a branch portion by changing an electrical-branch system of the prior art to an optical branch system of the present invention.

Moreover, an optical amplifier has advantages that it has low noise and superior linearity and it is possible to keep the linearity even if the number of optical levels is increased, compared to an electrical-amplifier.

However, reflection and distortion occur when impedance becomes uncontrollable because the electrical-amplifier is connected through a resistance but in the case of the optical amplifier, less reflection or no distortion occurs because an optical fiber is used.

Therefore, an optical-signal autocorrelation-bit-error detection apparatus of the present invention using an optical branch system can make the most use of the above quality evaluation technique for a high-quality line using a Q-factor.

BEST MODE FOR CARRYING OUT OF THE INVENTION

Embodiments of the present invention are described below by referring to the accompanying drawings.

FIRST EMBODIMENT

In the case of this embodiment, an optical-signal autocorrelation-bit-error detection apparatus and method are described below which use an optical branch system for first branching an optical signal to be measured and then converting branched optical signals into electrical signals.

Figure 1:
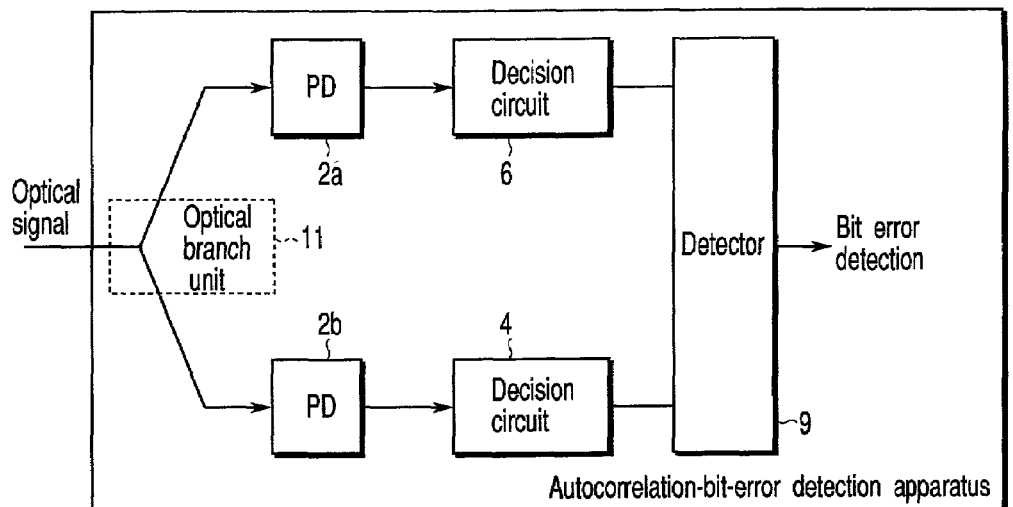
FIG. 1 is a block diagram for explaining a configuration of an optical-signal autocorrelation-bit-error detection apparatus of a first embodiment of the present invention using an optical branch system.

FIG. 1 is a block diagram illustrating a configuration of the optical-signal autocorrelation-bit-error detection apparatus of this embodiment using an optical branch system.

Figure 5:
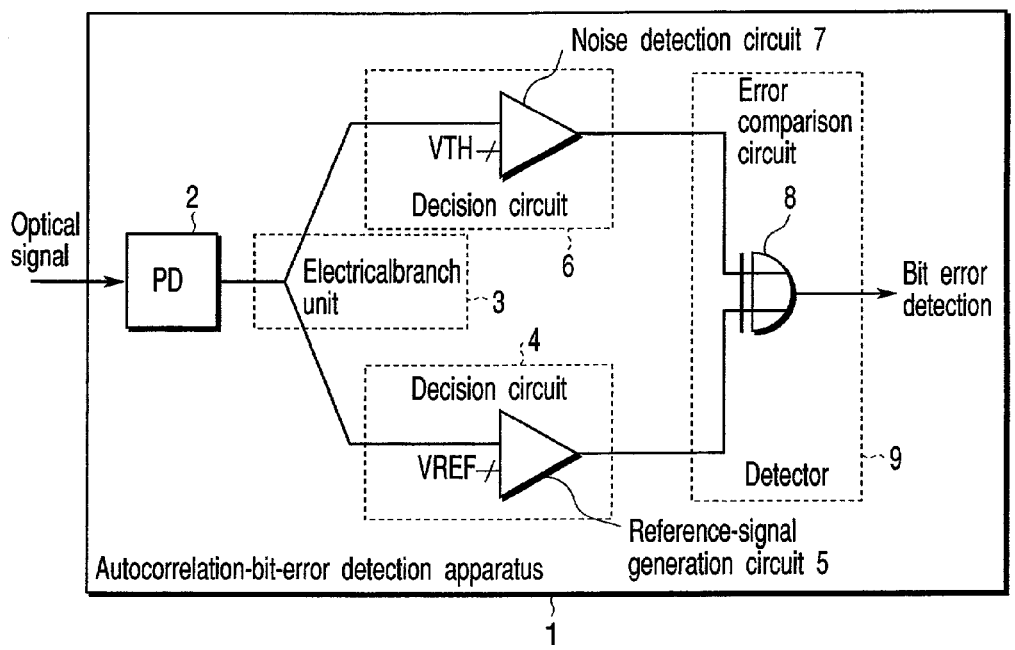
FIG. 5 is a block diagram for explaining a configuration of a conventional optical-signal autocorrelation-bit-error detection apparatus using an electrical branch system.
Figure 6:
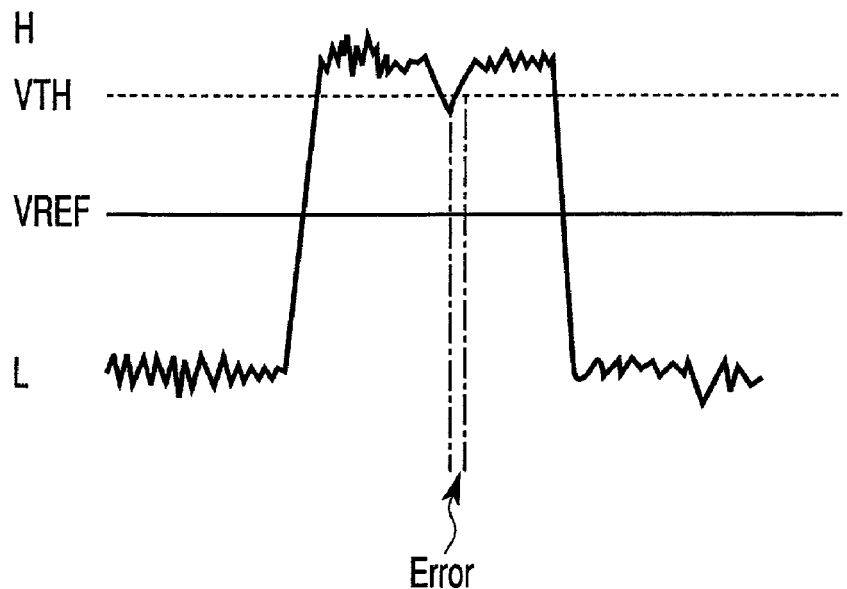
FIG. 6 is an illustration for explaining an error detection state of a conventional optical-signal autocorrelation-bit-error detection apparatus using an electrical-branch system.
Figure 7:
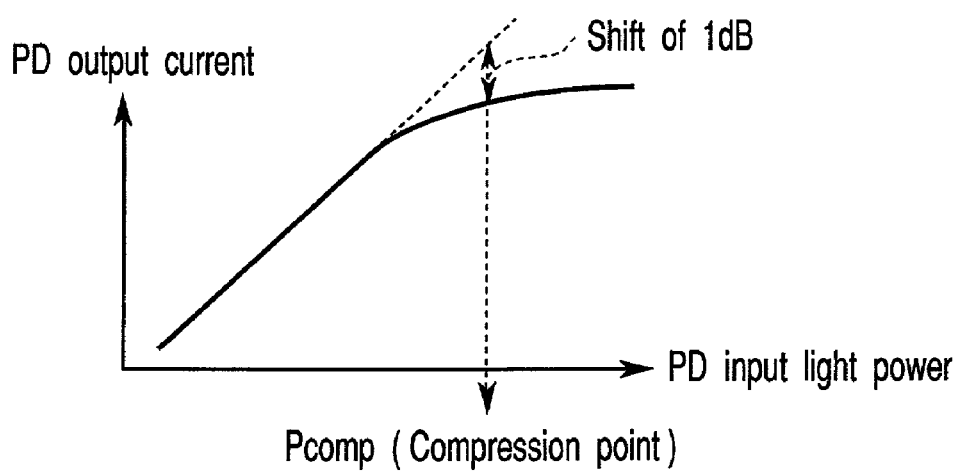
FIG. 7 is an illustration for explaining the conversion characteristic of a conventional light-to-electricity converter.
Figure 8:
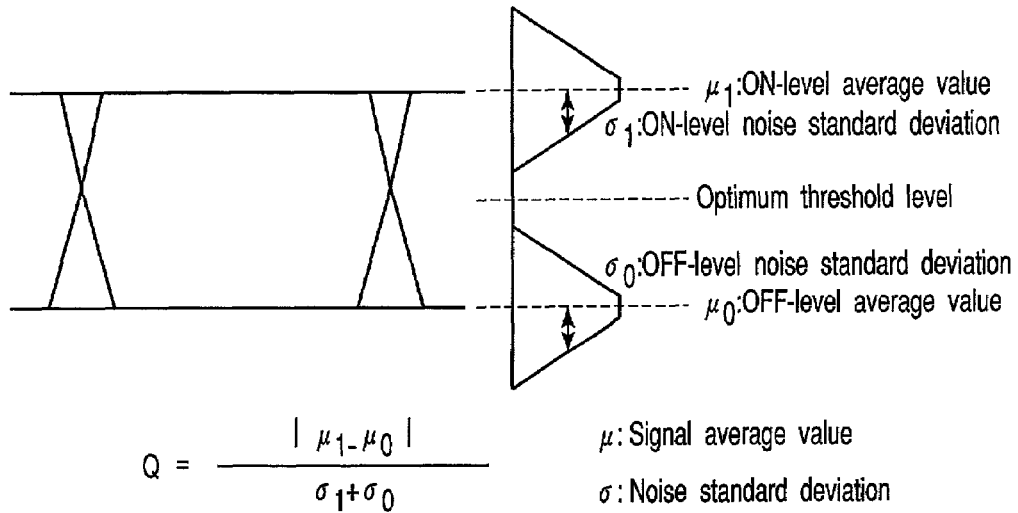
FIG. 8 is an illustration for explaining a quality evaluation technique for a high-quality optical transmission line by a Q-factor used for an optical-signal autocorrelation-bit-error detection apparatus.
Figure 9:
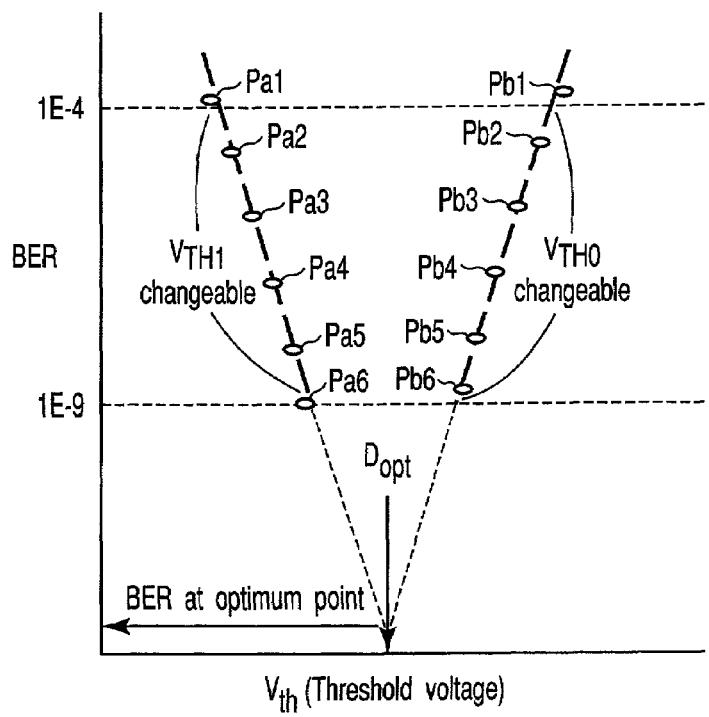
FIG. 9 is an illustration for explaining the principle of a Q-factor measuring system used for an optical-signal autocorrelation-bit-error detection apparatus.

In FIG. 1, the parts identical to that of FIG. 5 are given the same symbols and their description is omitted. Only the parts that differ are described below in detail.

In the case of the optical-signal autocorrelation-bit-error detection apparatus 10 using an optical branch system, an input optical signal to be measured is first branched into two optical signals by an optical branch unit 11 constituted of the so-called 3-dBm coupler such as an optical fiber splitter.

Then, these two branched optical signals are converted into electrical signals by light-to-electricity converters (PD) 2b and 2a.

Thereafter, these two signals are processed by decision circuits 4 and 6 and a detector 9 similarly to the case of FIG. 5 and thereby, autocorrelation bit errors of optical signals to be measured are detected.

That is, in the case of the optical-signal autocorrelation-bit-error detection apparatus 10 of this embodiment using an optical branch system, the voltage of a first electrical signal light-to-electricity-converted by the light-to-electricity converter (PD) 2b is compared with the reference voltage $V_{REF}$ (refer to FIG. 5) by the decision circuit 4 by using the comparison result as a reference signal.

The decision circuit 4 includes the reference-signal generation circuit 5 (refer to FIG. 5) in which the median of the amplitude of the first electrical signal light-to-electricity-converted by the light-to-electricity converter (PD) 2b is set as the reference voltage $V_{REF}$.

Moreover, in the case of the optical-signal autocorrelation-bit-error detection apparatus 10 of this embodiment using an optical branch system, the voltage of the second electrical signal light-to-electricity-converted by the light-to-electricity converter (PD) 2a is compared with the noise detection voltage $V_{TH}$ (refer to FIG. 5) to use the decision result as a noise detection signal.

The decision circuit 6 includes the noise detection circuit 7 (refer to FIG. 5) in which the voltage value at an optional level slid from the center of the amplitude of the second electrical signal light-to-electricity-converted by the light-to-electricity converter (PD) 2a to the mark side (H side) or space side (L side) is set as the noise detection voltage $V_{TH}$.

Moreover, the detector 9 includes the error comparison circuit 8 (refer to FIG. 5) for comparing matching and mismatching between a reference signal obtained by the decision circuit 4 and reference-signal generation circuit 5 and a noise detection signal obtained by the decision circuit 6 and reference-signal generation circuit 7.

Figure 2A:
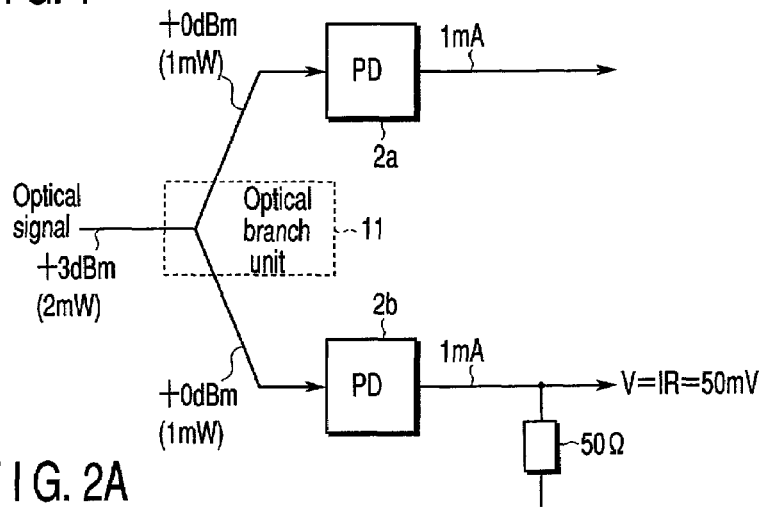
FIGS. 2A and 2B are block diagrams for explaining comparative examples to which the optical-signal autocorrelation-bit-error detection apparatus of the first embodiment of the present invention using an optical branch system and a conventional optical-signal autocorrelation-bit-error detection apparatus using an electrical-branch system are applied.
Figure 2B:
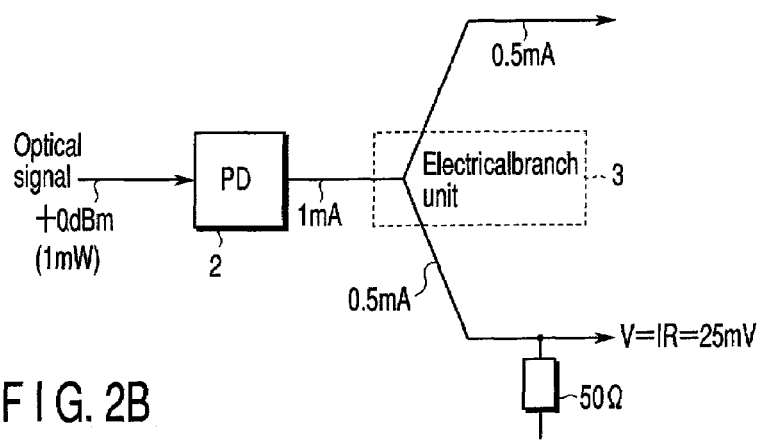

FIGS. 2A and 2B are block diagrams showing comparative examples to which the autocorrelation-bit-error detection apparatus 10 of this embodiment using an optical branch system and the conventional autocorrelation-bit-error detection apparatus 1 using an electrical-branch system are applied.

FIG. 2A is an example to which the autocorrelation-bit-error detection apparatus 10 of this embodiment using an optical branch system is applied.

For example, it is assumed that the light-to-electricity converters (PD) 2a and 2b used for this embodiment respectively have a compression point $P_{comp}$ of 0 dB and a current conversion efficiency of 1 (A/W).

To measure autocorrelation bit errors of optical signals to be measured while securing the linearity of outputs of the light-to-electricity converters (PD) 2a and 2b, it is necessary to suppress the light input to the light-to-electricity converters (PD) 2a and 2b to 0 dBm or less.

In this case, it is assumed that an optical signal of +3 dBm (2 mW) is input to the autocorrelation-bit-error detection apparatus 10 of this embodiment using an optical branch system as an optical signal to be measured.

Then, in the case of the autocorrelation-bit-error detection apparatus 10 of this embodiment using an optical branch system, the input optical signal to be measured is branched into two optical signals by the optical branch unit 11 constituted of a 3-dBm coupler and thereby, branched first and second optical signals respectively become +0 dBm (1 mW).

Therefore, it is possible to convert optical signals to be measured into electrical signals while securing the linearity of outputs of the rear-stage light-to-electricity converters (PD) 2a and 2b.

Thereby, 1-mA current signals are output from the light-to-electricity converters (PD) 2a and 2b as light-to-electricity-converted first and second electrical signals.

FIG. 2B shows an example of the above-described conventional autocorrelation-bit-error detection apparatus 1 using an electrical-branch system.

In the case of the autocorrelation-bit-error detection apparatus 1 using an electrical branch system, an optical signal is directly input into the light-to-electricity converter (PD) 2. Therefore, to secure the linearity of an output of the light-to-electricity converter (PD) 2, it is necessary to input an optical signal not exceeding a compression point of 0 dBm of the output.

When an optical signal of 0 dBm to be measured meeting the above condition is input, it is converted into an electrical signal of 1 mA by the light-to-electricity converter (PD) 2.

Moreover, the electrical signal is branched by the electrical-branch unit 3 and output current signals I of 0.5 mA, that is, V=IR in terms of voltage V (R denotes the input impedance of decision circuits 4 and 6 and is equal to 50Ω in this case)=0.5 mA×50Ω=25 mV is output.

Moreover, the autocorrelation-bit-error detection apparatus 10 of this embodiment using an optical branch system shown in FIG. 2A can raise the power of an optical signal to be measured input to the optical branch unit 11 up to 0 dBm after the optical signal is branched by the optical branch unit 11 as described above.

Thereby, the autocorrelation-bit-error detection apparatus 10 of this embodiment using an optical branch system can double the power of input light to be measured compared to the case of the conventional autocorrelation-bit-error detection apparatus 1 using an electrical-branch system when using, for example, a two-branch system.

That is, because the autocorrelation-bit-error detection apparatus 10 of this embodiment using an optical branch system can double the power of input light to be measured when using a two-branch system, it has an advantage that the power level of a usable optical signal can be raised up to +3 dBm (2 mW) though the power level has been restricted to 0 dBm so far.

Moreover, in the case of the autocorrelation-bit-error detection apparatus 10 of this embodiment using an optical branch system, the electrical-branch unit 3 does not have any power loss compared to the case of the conventional autocorrelation-bit-error detection apparatus 1 using an electrical-branch system. Therefore, when using a two-branch system, the apparatus 10 can supply an output voltage V (=IR=1 mA×50Ω=50 mV) two times higher than the output voltage of the conventional autocorrelation-bit-error detection apparatus 1 using an electrical-branch system to the decision circuits 4 and 6. Thus, it is possible to prevent the S/N from being deteriorated due to a voltage drop like the case of the conventional autocorrelation-bit-error detection apparatus 1 using an electrical-branch system.

Therefore, this embodiment makes it possible to provide an optical-signal autocorrelation-bit-error detection apparatus using an optical branch system capable of making the most use of the advantages of the quality evaluation technique for a high-quality line using a Q-factor by improving the performance of bit error measurement using an autocorrelation system for an optical signal to be measured.

SECOND EMBODIMENT

In the case of this embodiment, an autocorrelation-error detection apparatus when an optical branch unit branches light power under an uniform state is described though the basic configuration is the same as that of the autocorrelation-error detection apparatus of the above first embodiment using an optical branch system.

Figure 4:
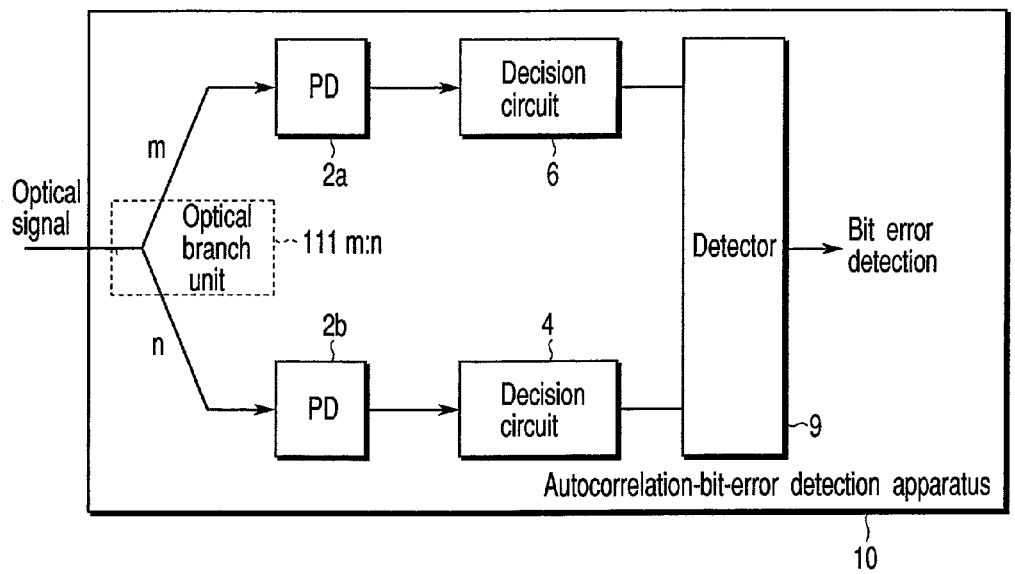
FIG. 4 is a block diagram for explaining a configuration of an optical-signal autocorrelation-bit-error detection apparatus of a second embodiment of the present invention using an optical branch system.

FIG. 4 is a block diagram illustrating a configuration of the autocorrelation-error detection apparatus of this embodiment using an optical branch system.

In FIG. 4, the parts identical to that of FIG. 1 are shown by the same symbols and their description is omitted. Only the parts that differ are described below in detail.

The autocorrelation-error detection apparatus 10 branches an optical signal to be measured into m:n (m>n) by an optical branch unit 111.

This is because the waveform linearity of an optical signal branched by the optical branch unit 111 can be obtained at the side for detecting noise but wave linearity cannot be always obtained at the reference side (it is enough that 0 or 1 can be determined).

Therefore, it is permitted to branch the input light of 1.1 mW to be measured m:n (m>n) and branch the noise side into 1.0 mW and the reference side into 0.1 mW or amplify an electrical signal at the reference side by an amplifier and use it as a reference signal.

Therefore, it is permitted to branch the input light of 1.1 mW to be measured m:n (m>n) and branch the noise side into 1.0 mV and the reference side into 0.1 mV or amplify an electrical signal at the reference side by an amplifier and use it as a reference signal.

As described above in detail, the optical branch unit 111 previously branches an input optical signal and then, converts branched optical signals into electrical signals so as to perform the bit error measurement using an autocorrelation system.

Thereby, the optical-signal autocorrelation-bit-error detection apparatus of this embodiment using an optical branch system can handle a high-power optical signal and prevent an S/N ratio from being deteriorated.

Thus, the optical-signal autocorrelation-bit-error detection apparatus of this embodiment using an optical branch system can improve the performance of the bit error measurement using an autocorrelation system.

Moreover, the optical-signal autocorrelation-bit-error detection apparatus of this embodiment using an optical branch system can reduce only a waveform distortion because of branching an optical signal superior to an electrical signal in frequency characteristic.

Therefore, this embodiment makes it possible to provide an optical-signal autocorrelation-bit-error detection apparatus and method using an optical branch system capable of making the most use of advantages of the quality evaluation technique for a high-quality line using a Q-factor by improving the performance for measuring bit errors of optical signals to be measured using an autocorrelation system.

THIRD EMBODIMENT

In the case of this embodiment, an autocorrelation-bit-error detection apparatus for branching an optical signal to be measured into three or more optical signals is described.

Figure 3:
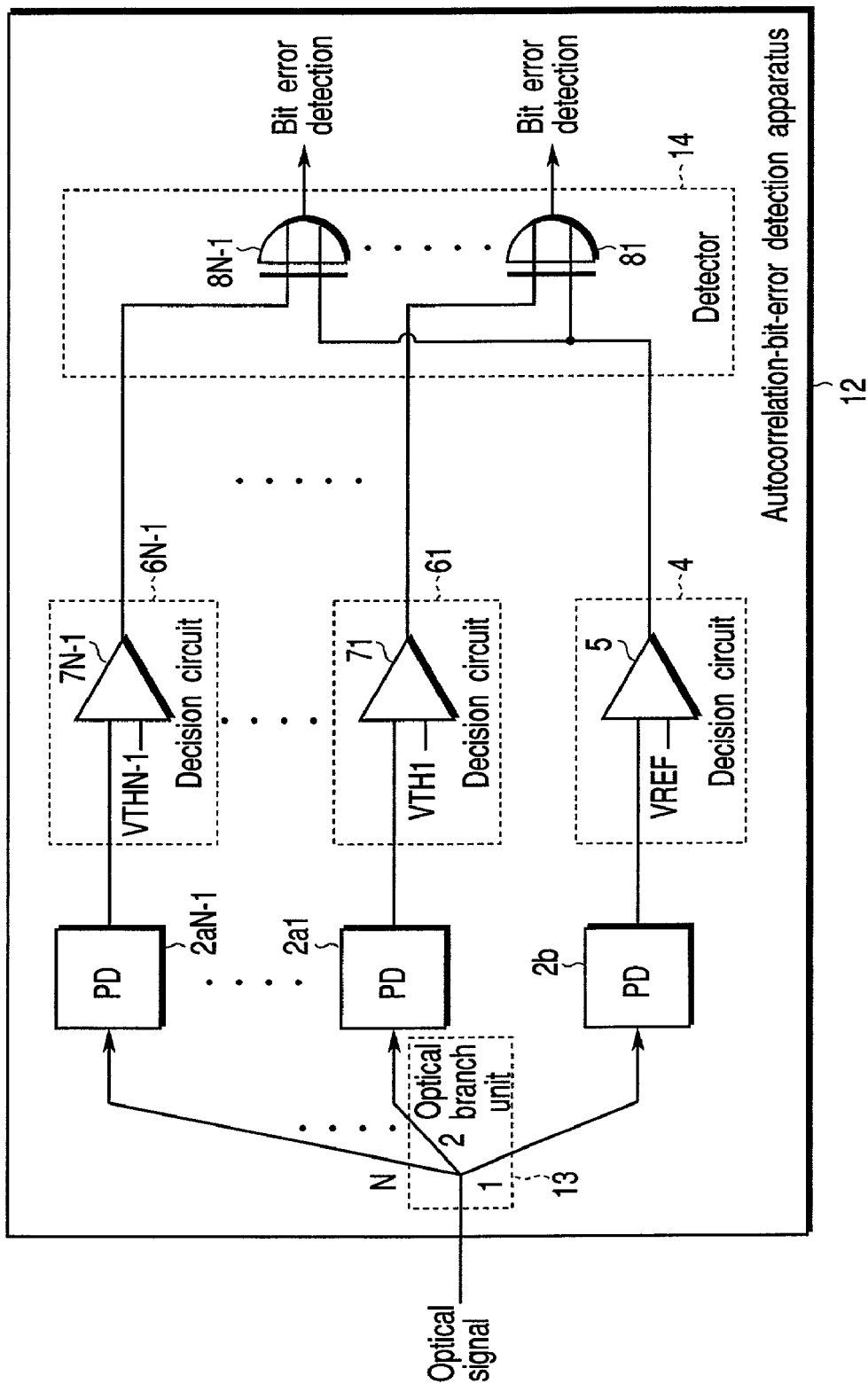
FIG. 3 is a block diagram for explaining an optical-signal autocorrelation-bit-error detection apparatus of a third embodiment of the present invention using an optical branch system.

FIG. 3 is a block diagram illustrating a configuration of the autocorrelation-bit-error detection apparatus of this embodiment using an optical branch system.

In FIG. 3, the parts identical to that of FIGS. 1 and 5 are shown by the same symbols and their description is omitted. Only the parts that differ are described below in detail.

The autocorrelation-bit-error detection apparatus 12 of the third embodiment using an optical branch system first branches an input optical signal to be measured into N optical signals (N is an integer of 3 or more) by an optical branch unit 13.

Then, any one of the N optical signals branched by the optical branch unit 13 is converted into an electrical signal by a light-to-electricity converter (PD) 2b and input to a decision circuit 4.

Moreover, other optical signals branched by the optical branch unit 13 are converted into electrical signals by light-to-electricity converters (PD) 2a1, . . . , and 2aN and input to decision circuits 61, . . . , and 6N−1.

The decision circuits 61, . . . , and 6N−1 include noise detection circuits 71, . . . , and 7N−1 in which individual noise detection voltages $V_{TH1}$, . . . , and $V_{THN-1}$ and output noise detection signals.

A detector 14 compares a reference signal with noise detection signals output from the decision circuits 61, . . . , and 6N−1 and detects autocorrelation bit errors of optical signals to be measured.

The autocorrelation-error detection apparatus 12 using the N-branch system can supply a voltage N times higher than that of an autocorrelation error detection apparatus using an electricalN-branch system to the decision circuits 4, 61, . . . , and 6N−1 and thereby, the same advantage as in the case of the first embodiment can be obtained from the apparatus 12.

Moreover, because the autocorrelation-error detection apparatus 12 using the optical N-branch system can detect errors of voltages $V_{TH1}$, . . . , and $V_{THN-1}$ at the same time, it is possible to reduce the measurement time.

Therefore, this embodiment makes it possible to provide an optical-signal autocorrelation-bit-error detection apparatus and method using an optical branch system capable of making the most use of advantages of the quality evaluation technique for a high-quality line using a Q-factor by improving the performance for measuring bit errors of optical signals to be measured using an autocorrelation system.

FOURTH EMBODIMENT

For this embodiment, a case is described in which an optical-signal autocorrelation-bit-error detection apparatus and method using an optical branch system for branching an optical signal and converting branched optical signals into electrical signals is applied to a bit-error-rate measuring device.

Figure 10:
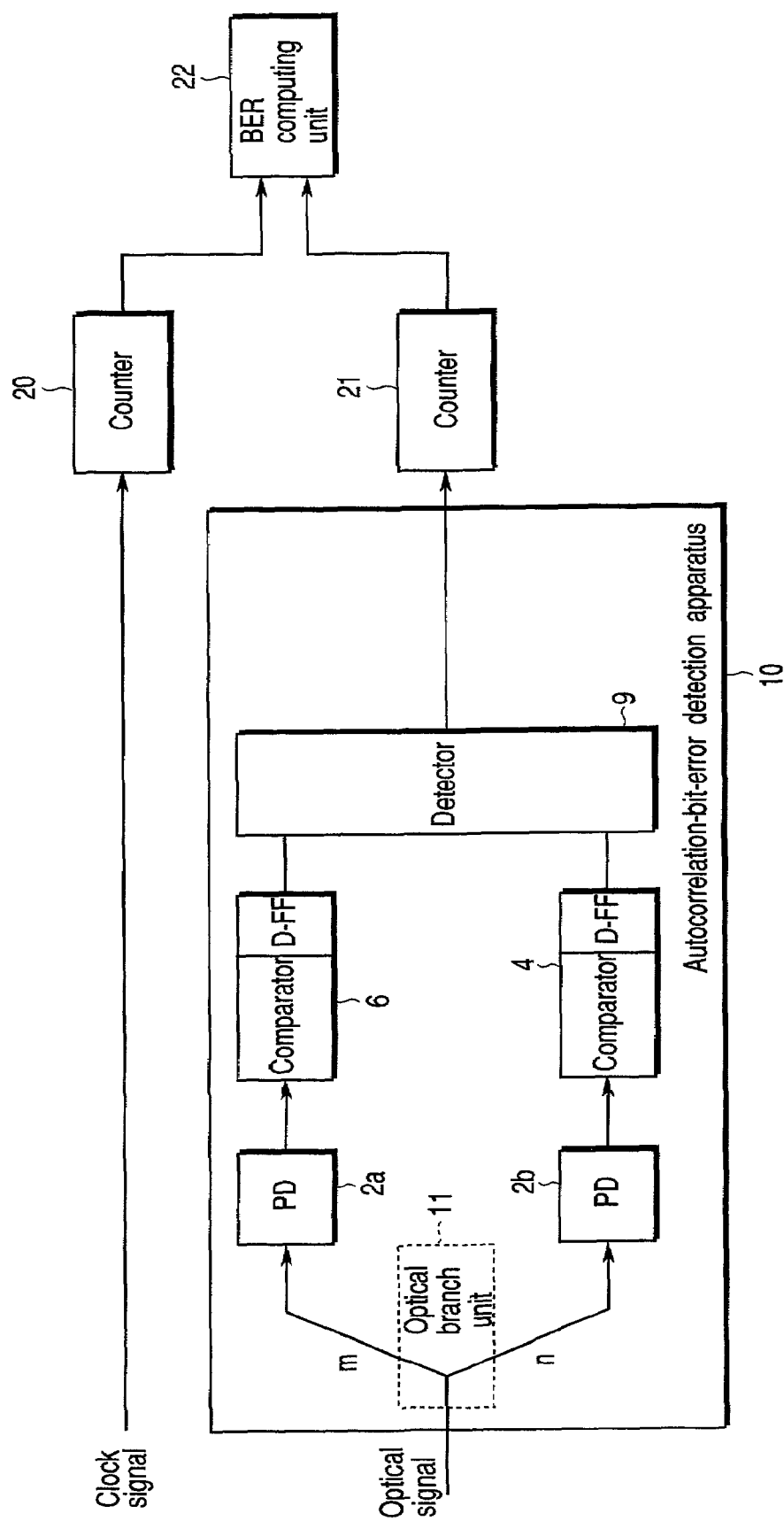
FIG. 10 is a block diagram for explaining a configuration when applying an optical-signal autocorrelation-bit-error detection apparatus using an optical branch system to an optical-signal bit-error-rate measuring device as a fourth embodiment of the present invention.

FIG. 10 is a block diagram for explaining a configuration when the optical-signal autocorrelation-bit-error detection apparatus 10 using an optical branch system is applied to an optical-signal bit-error-rate measuring device as a fourth embodiment of the present invention.

In FIG. 10, the parts identical to that of FIGS. 1 and 5 are shown by the same symbols and their description is omitted. Only the parts that differ are described below in detail.

That is, in the case of the optical-signal autocorrelation-bit-error detection apparatus 10 using an optical branch system, an input optical signal to be measured is first branched into two optical signals by an optical branch unit 11 constituted of the so-called 3-dBm coupler such as an optical-fiber splitter.

Then, two branched optical signals are converted into electrical signals by light-to-electricity converters (PD) 2b and 2a.

Thereafter, the two branched optical signals are processed by the decision circuits 4 and 6 and detector 9 similarly to the case of FIGS. 1 and 5 and thereby, autocorrelation bit errors of optical signals to be measured are detected.

It is assumed that the decision circuits 4 and 6 of this embodiment are respectively constituted of a comparator and a D-type flip flop (D-FF).

Moreover, a clock signal supplied from a clock generation circuit (not illustrated) changes states of D-FFs in the decision circuits 4 and 6 through a delay circuit (not illustrated) at a predetermined timing and is supplied to a counter 20.

However, an autocorrelation bit error detected by the detector 9 in the autocorrelation-bit-error detection apparatus 10 is supplied to a counter 21.

Outputs of these counters 20 and 21 are supplied to a bit-error-rate computing unit 22.

That is, the bit-error-rate computing unit 22 measures a bit error rate (BER) which is an autocorrelation-bit-error incidence for predetermined unit time in accordance with a counted value of clock signals supplied from the counter 20 and a counted value of autocorrelation bit errors supplied from the counter 21.

Therefore, this embodiment makes it possible to provide an optical-signal bit-error-rate measuring device to which an optical-signal autocorrelation-bit-error detection apparatus using an optical branch system capable makes the most use of advantages of the quality evaluation technique for a high-quality line using a Q-factor by improving the performance for measuring bit errors of optical signals to be measured using an autocorrelation system.

The invention claimed is:

1. An optical-signal autocorrelation-bit-error detection apparatus using an optical branch system, comprising:
   optical branch means for branching an optical signal to be measured modulated by a pulse signal and outputting branched optical signals as first and second optical pulse signals;
   first light-to-electricity conversion means for converting the first optical pulse signal supplied from said optical branch means into a first electrical signal and outputting the first electrical signal;
   second light-to-electricity conversion means for converting the second optical pulse signal supplied from said optical branch means into a second electrical signal and outputting the second electrical signal;
   first decision means for outputting a reference pulse signal in accordance with a comparison result between the voltage of the first electrical signal supplied from said first light-to-electricity conversion means and a reference-signal generation voltage set to an approximate median of the amplitude of said first electrical signal;
   second decision means for outputting a measuring pulse signal in accordance with a comparison result between the voltage of the second electrical signal supplied from said second light-to-electricity conversion means and a noise detection voltage set to an optional level slid from an approximate median of the amplitude of said second electrical signal to a mark side or space side; and
   bit error detection means for detecting an autocorrelation bit error of said optical signal to be measured in accordance with a comparison result between the reference pulse signal supplied from said first decision means and the measuring pulse signal supplied from said second decision means,
   wherein said optical branch means outputs said first and second optical pulse signals by setting magnitudes of the signals to m:n (m>n) where m corresponds to the magnitude of said second optical pulse signal and n corresponds to the magnitude of the first optical pulse signal so that the magnitude of the second optical pulse signal is greater than that of the first optical pulse signal when optically branching said optical signal to be measured into said first optical pulse signal at the reference side and into said second optical pulse signal at the noise detection side.

2. The optical-signal autocorrelation-bit-error detection apparatus according to claim 1, wherein:
   said optical branch means branches said optical signal to be measured into N optical signals and outputs them as first, second, third, . . . , and Nth (N is an integer of 3 or more) optical pulse signals,
   said autocorrelation-bit-error detection apparatus further comprises:
   third to Nth light-to-electricity conversion means for converting said third to Nth pulse signals supplied from said optical branch means into third to Nth electrical signals and outputting the third to Nth electrical signals, and
   third to Nth decision means for outputting second to Nth measuring pulse signals in accordance with comparison results between voltages of said third to Nth electrical signals supplied from said third to Nth light-to-electricity conversion means and noise detection voltages set to optional levels slid from approximate medians of amplitudes of said third to Nth electrical signals to the mark side or space side, and
   wherein said bit error detection means detects the autocorrelation bit error of said optical signal to be measured in accordance with comparison results between the reference signal supplied from said first decision means and said second to Nth measuring pulse signals supplied from said second to Nth decision means.

3. The optical-signal autocorrelation-bit-error detection apparatus using an optical branch system according to claim 1, wherein it is made possible to measure the autocorrelation bit error rate of said optical signal to be measured in accordance with a counted value of autocorrelation bit errors of said optical signal to be measured supplied from said bit error detection means and a counted value of clock signals.

4. An optical-signal autocorrelation-bit-error detection method using an optical branch system, comprising the steps of:
   branching an optical signal to be measured modulated by a pulse signal and outputting branched optical signals as first and second optical pulse signals;
   converting said first optical pulse signal into a first electrical signal and outputting the first electrical signal;
   converting said second optical pulse signal into a second electrical signal and outputting the second electrical signal;
   outputting a reference pulse signal in accordance with a comparison result between the voltage of said first electrical signal and a reference-signal generation voltage set to an approximate median of the amplitude of said first electrical signal;
   outputting a measuring pulse signal in accordance with a comparison result between the voltage of said second electrical signal and a noise detection voltage set to an optional level slid from an approximate median of the amplitude of said second electrical signal to a mark side or space side; and
   detecting the autocorrelation bit error of said optical signal to be measured in accordance with a comparison result between said reference pulse signal and said measuring pulse signal,
   wherein said branching step outputs said first and second optical pulse signals by setting magnitudes of the signals to m:n (m>n) where m corresponds to the magnitude of the second optical pulse signal and n corresponds to the magnitude of the first optical pulse signal so that the magnitude of the second optical pulse signal is greater than the magnitude of the first optical pulse signal when optically branching the optical signal to be measured into the first optical pulse signal at the reference side and into the second optical pulse signal at the noise detection side.

5. The optical-signal autocorrelation-bit-error detection method using an optical branch system according to claim 4, further comprising the step of:
   measuring the autocorrelation bit error rate of said optical signal to be measured in accordance with a counted value of autocorrelation bit errors of said optical signal to be measured and a counted value of clock signals.

* * * * *